US008819648B2

(12) United States Patent
Brown

(10) Patent No.: US 8,819,648 B2
(45) Date of Patent: Aug. 26, 2014

(54) CONTROL FLOW MANAGEMENT FOR EXECUTION OF DYNAMICALLY TRANSLATED NON-NATIVE CODE IN A VIRTUAL HOSTING ENVIRONMENT

(75) Inventor: Alexander Barraclough Brown, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 13/554,141

(22) Filed: Jul. 20, 2012

(65) Prior Publication Data

US 2014/0025893 A1    Jan. 23, 2014

(51) Int. Cl.
*G06F 9/45* (2006.01)

(52) U.S. Cl.
USPC .......................... 717/136; 717/137; 717/148

(58) Field of Classification Search
USPC .............. 717/126–129, 131–143, 147–148
IPC .................. G06F 9/4812,8/40, 8/41, 8/51, 8/52
See application file for complete search history.

(56) References Cited

U.S. PATENT DOCUMENTS

| 5,222,215 | A  * | 6/1993  | Chou et al. ..................... 710/262 |
| 6,397,379 | B1 * | 5/2002  | Yates et al. ..................... 717/140 |
| 6,502,237 | B1 * | 12/2002 | Yates et al. ..................... 717/136 |
| 6,631,515 | B1 * | 10/2003 | Berstis ........................... 717/140 |
| 6,954,923 | B1 * | 10/2005 | Yates et al. ..................... 717/130 |
| 7,013,456 | B1 * | 3/2006  | Van Dyke et al. ............. 717/130 |
| 7,316,010 | B1 * | 1/2008  | Daynes et al. ................. 717/140 |
| 7,330,942 | B2   | 2/2008  | de Dinechin et al. |
| 7,350,197 | B2 * | 3/2008  | Savov ............................ 717/137 |
| 7,428,626 | B2   | 9/2008  | Vega |
| 7,434,025 | B2   | 10/2008 | Taileffer |
| 7,490,191 | B2   | 2/2009  | Illikkal et al. |
| 7,594,221 | B2 * | 9/2009  | Bhushan et al. .............. 717/136 |
| 7,757,034 | B1   | 7/2010  | Dobrovolskiy et al. |
| 7,779,394 | B2 * | 8/2010  | Homing et al. ............... 717/136 |
| 7,984,304 | B1 * | 7/2011  | Waldspurger et al. ........ 713/187 |
| 8,286,147 | B2 * | 10/2012 | Alpern et al. ................. 717/138 |
| 8,312,439 | B2 * | 11/2012 | Kielstra et al. ................ 717/148 |
| 8,365,156 | B2 * | 1/2013  | Sollich .......................... 717/146 |
| 8,458,674 | B2 * | 6/2013  | Barraclough et al. ........ 717/138 |
| 8,479,196 | B2 * | 7/2013  | Day et al. .......................... 718/1 |
| 8,561,040 | B2 * | 10/2013 | Rose ............................. 717/148 |
| 8,683,451 | B1 * | 3/2014  | Cox et al. ..................... 717/136 |

(Continued)

OTHER PUBLICATIONS

Huang et al, "A Case for High Performance Computing with Virtual Machines", ACM, pp. 125-134, 2006.*

(Continued)

*Primary Examiner* — Anil Khatri
(74) *Attorney, Agent, or Firm* — Thomas E. Tyson

(57) ABSTRACT

Execution of non-native operating system images within a virtualized computer system is improved by providing a mechanism for retrieving translated code physical addresses corresponding to un-translated code branch target addresses using a host code map. Hardware acceleration mechanisms, such as content-accessible look-up tables, directory hardware, or processor instructions that operate on tables in memory can be provided to accelerate the performance of the translation mechanism. The virtual address of the branch instruction target is used as a key to look up a corresponding record that contains a physical address of the translated code page containing the translated branch instruction target, and execution is directed to the physical address obtained from the record, once the physical page containing the translated code corresponding the target address is loaded in memory.

24 Claims, 5 Drawing Sheets

(56) References Cited

U.S. PATENT DOCUMENTS

| | | |
|---|---|---|
| 2004/0255279 A1 | 12/2004 | Rawsthorne et al. |
| 2005/0015756 A1 | 1/2005 | Brown et al. |
| 2005/0015781 A1 | 1/2005 | Brown et al. |
| 2009/0013149 A1 | 1/2009 | Uhlig et al. |
| 2009/0100416 A1 | 4/2009 | Brown et al. |

OTHER PUBLICATIONS

Alliet et al, "Complete Translation of Unsafe Native Code to Safe Bytecode", ACM, pp. 32-41, 2004.*

Hsieh et al, "Java Bytecode to Native Code Translation: The Caffeine Prototype and Preliminary Results", IEEE, pp. 90-97, 1996.*

Bohm et al, "Generalized Just-In-Time Trace Compilation using a Parallel Task Farm in a Dynamic Binary Translator", ACM, pp. 74-85, 2011.*

Hoang, et al. "A Case for Alternative Nested Paging Models for Virtualized Systems", IEEE Computer Architecture Letters, Jan. 2010, pp. 17-20, vol. 9, No. 1, Piscataway, NJ.

* cited by examiner

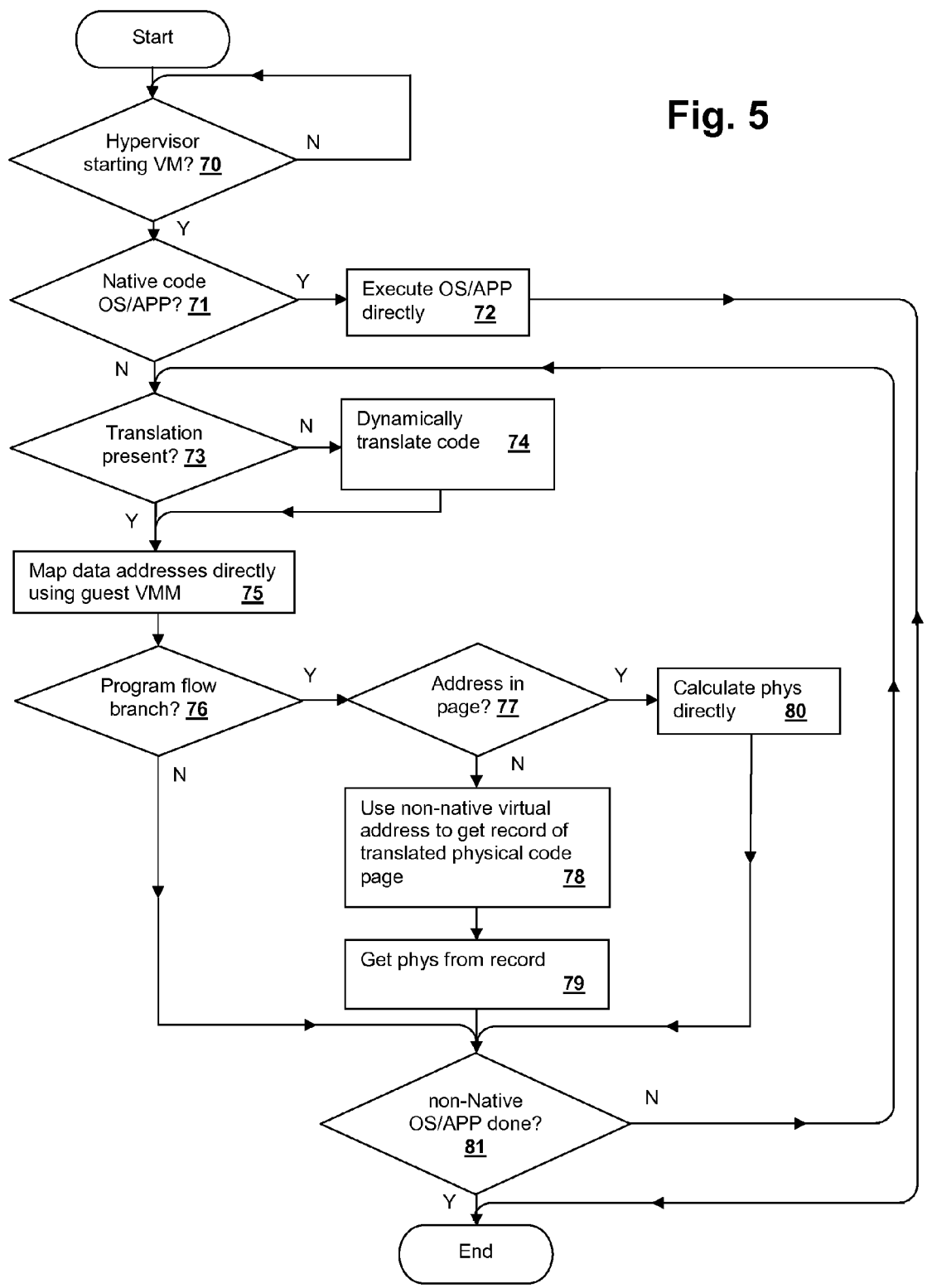

CONTROL FLOW MANAGEMENT FOR EXECUTION OF DYNAMICALLY TRANSLATED NON-NATIVE CODE IN A VIRTUAL HOSTING ENVIRONMENT

BACKGROUND OF THE INVENTION

1. Field of the Invention

The present invention is related to dynamic translation and execution of non-native program code in a virtual hosting environment, and more particularly to techniques for efficiently handling control flow changes while executing translated program code.

2. Description of Related Art

Virtualized computing systems, also known as cloud computing systems, provide large-scale computing functionality in applications such as management of large databases and scientific computing, and large-quantity server functionality in applications such as web page servers and other Internet traffic handling. A virtualized computer system typically provides a platform for executing instances of different operating systems, and hosting multiple applications within each operating systems instance. The computer hardware employed is also virtualized in the sense that multiple distributed processors and local memories form a large-scale multiprocessing system with a distributed system memory.

Dynamic code translation of non-native executables, including operating systems and program code, can be accomplished using code translation, i.e., emulation of the native processor by another processor using translated native code. Such translation provides for execution of the non-native code on processors that provide other native functionality when executing other operating systems/programs and that may provide enhanced performance and/or reduced cost over providing a dedicated processor and operating system that can natively handle the program code that otherwise requires translation.

However, there are several difficulties introduced when performing dynamic translation of non-native program code in a virtualized computing system. Since the guest operating system controls the mapping of guest virtual memory to guest physical memory, the host operating system does not necessarily have access to the mapping information. Further, since the guest operating system controls whether or not the un-translated guest program code is invalidated or modified, the host operating system cannot typically predict the flow of the guest program. In particular, when branch instructions are encountered, if the branch instruction target virtual address is in a different physical memory page than the branch instruction, then the physical code page containing the translated program code corresponding to the un-translated code at the target address must be located and if the page is cached, the page will be accessed. The delay in performing such address resolution may be very high and if the branch instruction is executed many times, the system performance penalty will be significant.

Therefore, it would be desirable to provide a method and program within a computer system that provides dynamic translation and execution of non-native guest programs that accelerates translation of guest code control instruction target virtual addresses.

BRIEF SUMMARY OF THE INVENTION

The invention is embodied in a computer-performed method, computer program product and computer system that provide virtualized execution environments for non-native programs and operating systems.

The method and computer program implement an environment that dynamically translates program code of a non-native guest operating system image, and applications executing within the image, to translated code that is expressed in operations native to the computer system. The translated code can be dynamically cached and the instructions are executed. Branch instructions are handled by either embedding the virtual target address from the un-translated program code or by inserting a tag via which the virtual target address can be retrieved. When the translated native program code representing the branch instruction is reached and the condition for the branch is satisfied, the virtual target address is used to retrieve the physical address of the translated native program code. The virtual target address is used as a key to retrieve a corresponding translated code physical address from a host code address map accessible within the guest operating system image. In one embodiment of the invention, the host code address map contains a virtual page for each physical page of native code that includes code that has been translated and retains a valid translation. The virtual page maps to an underlying physical page that contains, at each location corresponding to a non-native branch target offset in the page, a value that provides a mechanism for locating the non-native physical address of the branch target. The value may directly refer to the non-native physical address, or alternatively the reference may be made via some encoding (e.g., compressed pointer), or the value may index into another data structure that references the address of the translated code corresponding to the non-native virtual target address, and thereby refers to the non-native physical address implied by the combination of the virtual page and the offset. Thus, the virtual target address is used as a key to retrieve a corresponding translated code physical address. Hardware mechanisms may be provided to accelerate the retrieval of the translated code physical addresses that correspond to the branch instruction virtual target addresses.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 5 is a flow diagram depicting a method in accordance with an embodiment of the present invention.

DETAILED DESCRIPTION OF THE INVENTION

The present invention relates to execution of non-native operating system and application images within a virtualized computing system, i.e., a "cloud" computing system. When dynamically translating the program code of the non-native guest image, rather than requiring tagging or fixed linking of all branch target addresses that cross page boundaries in advance, the present invention provides a facility for dynamically resolving the target address of the branches from un-translated code virtual addresses, which can be embedded in the translated program code, to translated code physical addresses by performing a look-up of a translated code physical address using the un-translated code virtual address, all within the context of the guest operating system image. Dynamic binary translation techniques can then be efficiently applied within the virtualized computer system, such as the dynamic binary translation techniques disclosed in U.S. Patent Application Publications U.S. 20050015781 and U.S. 20090100416, each by the inventor and others, the disclosures of which are incorporated herein by reference. A per-image mapping table or other structure such as a hardware-accelerated look-up mechanism is provided to perform resolution of the un-translated code virtual address to a translated code physical code address. The resulting operation provides an improvement in execution speed and or flexibility in executing non-native programs and operating systems, since costly look-ups are reduced to a simple mapping operation.

Figure 1:
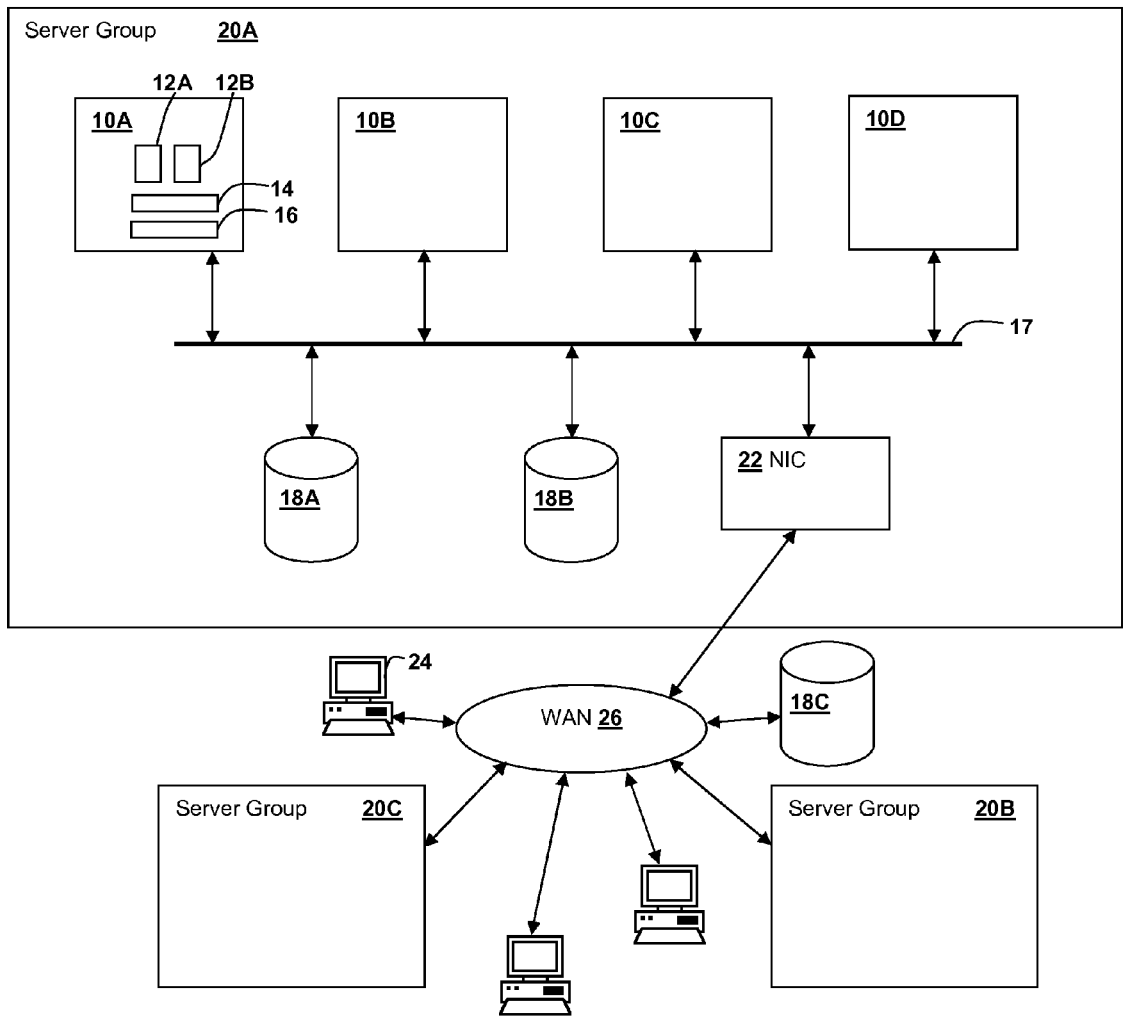
FIG. 1 is a block diagram illustrating a distributed computer system in which techniques according to an embodiment of the present invention are practiced.

Referring now to FIG. 1, a distributed computer system in which an embodiment of the present invention is practiced is depicted in a block diagram. A number of server groups 20A-20C are illustrated as connected via a wide area network (WAN) 26, which may be an Internet-connected network or other network. A plurality of workstation terminals 24 are also shown as coupled to WAN 26 and provided user communication with the networked computer system. In particular, a user interface for configuring a hypervisor and/or host operating system in accordance with an embodiment of the present invention is accessible via workstation terminals 24. Exemplary server group 20A includes a plurality of processing nodes 10A-10D, that each include processor cores 12A-12B, external cache levels 14 and system memory 16, which may be accessed by other processing nodes 10A coupled to local bus 17, and also by other server nodes coupled through WAN 26 via network interface controller (NIC) 22. Program instructions forming a hypervisor, operating system images and applications in accordance with embodiments of the present invention as described below are generally present in system memory 16 and executed by one or more of processor cores 12A-12B to provide for execution of guest operating system images and their associated applications programs. Physical storage within the networked computer system is provided by local storage 18A, 18B associated with server groups 20A-20C, and also networked storage subsystems 18C that are not associated with a particular server group.

The networked computer system of FIG. 1 is only an example of a physical computer system in which virtualized operation of multiple operating system images is practical and is supported by the hardware configuration. However it is understood that techniques in accordance with embodiments of the present invention as described in further detail below can be implemented in a variety of computer systems, both larger and smaller scaled.

Figure 2:
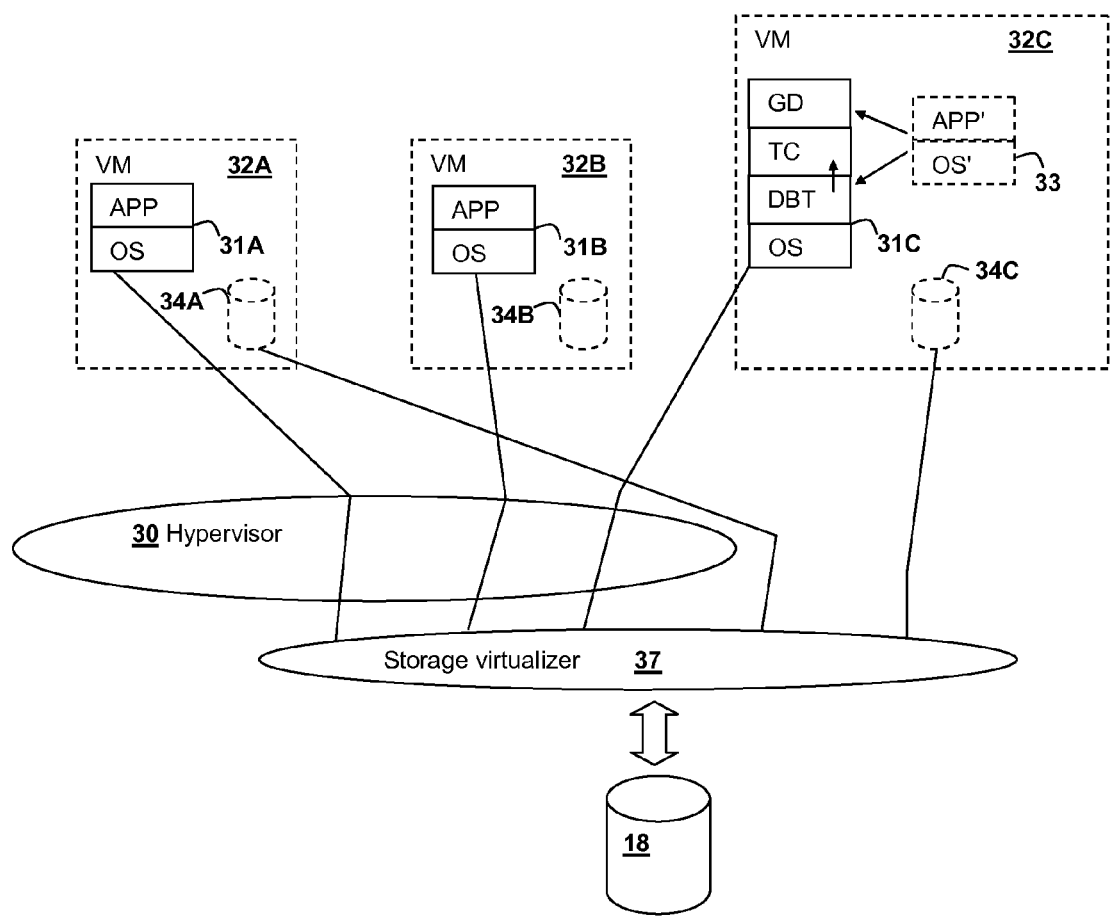
FIG. 2 is a block diagram illustrating a virtualized organization of software that can be executed within the system of FIG. 1, in accordance with an embodiment of the present invention.

Referring now to FIG. 2, organization of a virtualized computer system that may be executed within the computer system of FIG. 1, is shown in accordance with an embodiment of the present invention. A number of virtual machines (VMs) 32A-32C are illustrated, each having a guest operating system OS and application APP image 31A-31C. In the illustrative example, one operating system OS image is used per application, i.e., an operating system OS instance is generated for each application for which execution is requested by the system, as is the case with many Web-based computing models presently in use. However, it is understood that there may be multiple applications executed within one virtual machine, without substantially changing the manner in which the techniques of the present invention are performed. Each VM 32A-32C is also illustrated as having a virtual storage (disk) device 34A-34C, one for each of VMs 32A-32C. Virtual storage devices 34A-34C represent the disk device assigned for use by the virtual machine, which in the illustrative example is a single disk accessed by the applications, and by the operating systems for external storage. The data stored in virtual storage devices 34A-34C is allocated by a storage virtualizer 37, which manages the physical storage associated with maintaining virtual storage devices 34A-34C, as well as storage for operating systems images and provides the interface to physical storage devices 18 for the virtualized computer system.

In accordance with an embodiment of the present invention, VM 32C further includes a non-native guest operating system OS' and a non-native application APP' that are implemented with machine code instructions that are not native to the computer system, i.e., are not directly executable by cores 12A-12B of FIG. 1 and are incompatible with (native) guest operating system OS. A native code and data image 31C is provided to translate and execute non-native guest operating system OS' and a non-native application APP', which are usually stored in image 31C, but effectively as data, since the code within guest operating system OS' and a non-native application APP' is not executed directly. Data within guest operating system OS' and a non-native application APP' are mapped as data. Non-native guest operating system OS' hosts one or more non-native applications APP', which are also non-native. In order to execute OS' and non-native applications APP', operating system OS includes a dynamic binary translator DBT program that translates the program instructions of non-native guest operating system OS' and non-native applications APP' into native machine instructions forming translated code TC that is directly executable by cores 12A-12B. Translated code TC is generally paged in and out (cached) and accessed as needed for execution. When program flow instructions that correspond to branch instructions in the un-translated non-native program code are encountered in translated code TC, if the target virtual address for the non-native branch instruction is within the same virtual memory page as the un-translated branch instruction itself, then the target address can be computed directly. However, if the target virtual address is not within the virtual memory page as the branch instruction, then the location of the physical page corresponding to the target address is not usually known without a complicated process that maps from the virtual un-translated target address to the physical translated code address, which requires consulting, understanding the underlying structure of, or peeking into hardware mapping resources used by non-native operating system OS' in order to map the un-translated code virtual target address to an un-translated code physical address, and then consulting dynamic binary translator DBT to determine the physical page of translated code TC that contains program code corresponding to the virtual target address in the un-translated code. Since a branch instruction can be encountered a great number of times, a high penalty will be encountered if such a process is required every time the program code representing the un-translated code at the virtual target address is executed. The present invention provides mechanisms for dynamic translation of non-native operating system OS' and execution of translated code TC that resolve an un-translated code virtual target address directly to a translated code physical address within translated code TC.

Figure 3:
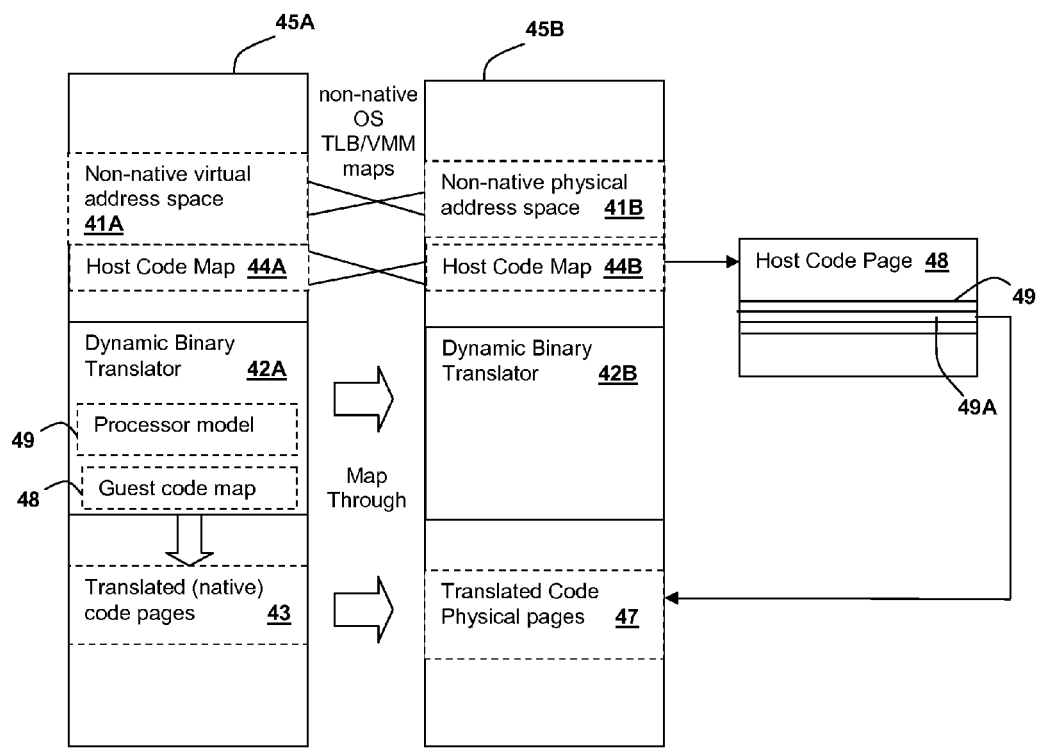
FIG. 3 is a memory map diagram illustrating operation of a computer system in accordance with an embodiment of the present invention.

Referring now to FIG. 3, a memory map within a computer system in accordance with an embodiment of the invention is shown. Within image 31C in FIG. 2, a virtual memory image 45A includes a virtual address space 41A of non-native operating system OS' and non-native applications APP2. A physical memory image 45B contains physical pages of non-native operating system OS' and non-native applications APP2, which are mapped by a virtual memory manager VMM of non-native operating system OS' and generally through a translation lookaside buffer (TLB) or other hardware resource used to map virtual to physical memory by non-native operating system OS', which may be emulated by native operating system OS, or provided by hardware resources within the computer system. Virtual memory image 45A also includes dynamic binary translator 42A, which is mapped directly to dynamic binary translator 42B code in physical memory 45B, as are the translated native code pages 43, which are native to processor cores 12A-12B in the computer system of Figure, which are mapped to translated code physical pages 47. Since native operating system OS described above, in conjunction with dynamic binary translator 42 completely emulate the hardware and software resources needed for operation of the non-native operating system OS', the mapping of non-native virtual address space 41A to guest physical address space 41B may be completely under the control of non-native operating system OS', since without reverse engineering, the mapping structures of some operating systems may be unknown. In contrast, the TLB mechanisms are generally processor-specific, and since the processor to which the non-native operating system OS' code is native is, or is compatible with, the processor being emulated, knowledge of the contents of the TLB can be used to further inform the techniques of the present invention, as described in further detail below.

Dynamic binary translator also maintains a processor model 49 that tracks the state of the emulated non-native processor and guest code map 48, which corresponds to the guest processor's associated TLB, or other hardware-assisted virtual-to-physical memory structure maintained by, or in conjunction with, processor model 49. Dynamic binary translator 42A produces translated (native) code pages 43, which form a set of cached pages, which are also mapped to physical memory 45B as translated code physical pages 47. It is not required that all of translated code pages 43 be mapped to translated code physical pages 47 at all times, but since storage is required, it is convenient to do so, since the present invention will provide for translated code execution to be re-directed directly to locations in translated code physical pages 47 once execution crosses a page boundary. As illustrated, in the exemplary embodiment, all of code and data mapped in virtual memory image 45A are mapped to physical address space 45B by native operating system OS except for non-native virtual address space 41A, which is mapped non-linearly to non-native physical address space 41B by whatever mechanism is used by non-native operating system OS' to map virtual to physical memory. Host code map 44A is also not mapped by native operating system OS, but is populated according to a relationship between non-native virtual code addresses and translated (native) code physical addresses, as described in further detail below. Host code map 44A is a feature provided by embodiments of the present invention that provides a non-native virtual to translated physical code address mapping so that translated code physical memory addresses can be retrieved using un-translated code virtual memory addresses. Therefore, it is not necessary for host code map 44A to contain references to data addresses, since the regular virtual memory manager of the guest operating system and associated TLB will provide data address mapping. However, data address mappings could be included in host code map 44A/44B if desirable to do so, e.g., if the process for populating the mappings is agnostic of whether the addresses are code or data addresses. In the depicted memory maps, when a context switch occurs in the native operating system that switches non-native operating system image OS' (takes the guest operating system off-line) and associated non-native applications APP', all of the host code map mappings, the state of the emulated processor, the translated code pages, etc., can also be swapped out to preserve their state. Otherwise, they can be rebuilt at the next context switch that swaps non-native operating system image OS' back in. When non-native operating system experiences a context switch, only non-native virtual address space 41A will be context switched, which reduces the amount of information that must be taken off-line and eventually restored. Also, host code maps 44A,44B will be maintained along with translated code pages 43,47. Further, by retaining translated code pages in memory, the translated code can be shared between processes.

In an embodiment of the present invention, host code map 44A maps to locations in host code map 44B, only for virtual addresses that were detected by dynamic binary translator 42A/42B as branch target addresses that cross page boundaries. Therefore, in the instant embodiment, host code maps 44A, 44B are generally sparse. However, in other embodiments of the invention, host code maps 44A, 44B contain entries for each page in non-native physical address space 41B, and in accordance with other embodiments of the invention, contain entries for each page in non-native physical address space 41B in which an instruction has been executed, alternatively, in accordance with yet other embodiments of the invention, entries can be retired based upon a last-recently-used (LRU) or most-recently used (MRU) algorithm. The translated pages in translated code physical pages 47 may optionally be retired in conjunction with removal of the host code map entries, or the translated pages may be retained and the host code map rebuilt when an instruction in a corresponding page is executed again.

Dynamic binary translator 42A/42B either embeds the virtual target address (from the un-translated branch instruction) in the translated program code, or inserts a tag that can be used to retrieve the virtual target address. When the translated program code reaches the instructions that handle the branch instruction from the un-translated program code, the virtual target address embedded or tagged in the translated code is used to retrieve a translated code physical address in the translated program code using host code map 44A/44B. The translated code physical address is the address of the translated program code that implements the operations in the un-translated guest code at the target address of the un-translated branch instruction. In the instant embodiment, the records stored in physical host code map 44B, which are accessed by pointers that correspond to virtual addresses in host code map 44A, contain pointers to locations in translated code physical pages 47, and corresponding entries in host code map 44A are located at the un-translated code virtual addresses specified as target addresses by branch instructions detected by dynamic binary translator 42A/42B. For non-native operating systems having pointers or records (e.g., BasicBlock structures) that are so large that the mapping from host code map 44A to host code map 44B breaks down due to insufficient space, the pointers can be compressed, e.g., by using offsets from a known base pointer, and/or by removing the offsets within the page, which can be restored by dynamic binary translator 42A/42B before execution is redirected. Entries are removed from host code map 44B (and mappings removed from host code map 44A) when physical translated code pages are invalidated or retired. Alternatively, the mappings may remain for invalidated pages, but the record pointers set to NULL, so that dynamic binary translator 42A/42B is called to resolve the pages, which prevents execution of code pages that have become invalid, e.g., because the code pages have been modified by another process. A page in host code map 44B contains a combination of records, each of which may correspond to a NULL entry or a valid (and possibly compressed) pointer. A given page in host code map 44B, when such a page exists at all, is likely to contain a combination of NULL and valid pointers, since not all code addresses are likely to be indirect branch targets and not all indirect branch targets will have been visited recently, and therefore the corresponding records may have been retired. Also, the indirect branch targets may not have been referenced since the system was started, and thus the records corresponding to those indirect branch targets have not been populated yet. Since non-native code virtual pages are translated dynamically and on-demand, as execution proceeds, a given page in host code map 44B may acquire more non-NULL entry points as more program code is translated, or less entry points as corresponding records are retired due to the LRU/MRU algorithm or the records are invalidated due to some other process.

Figure 4:
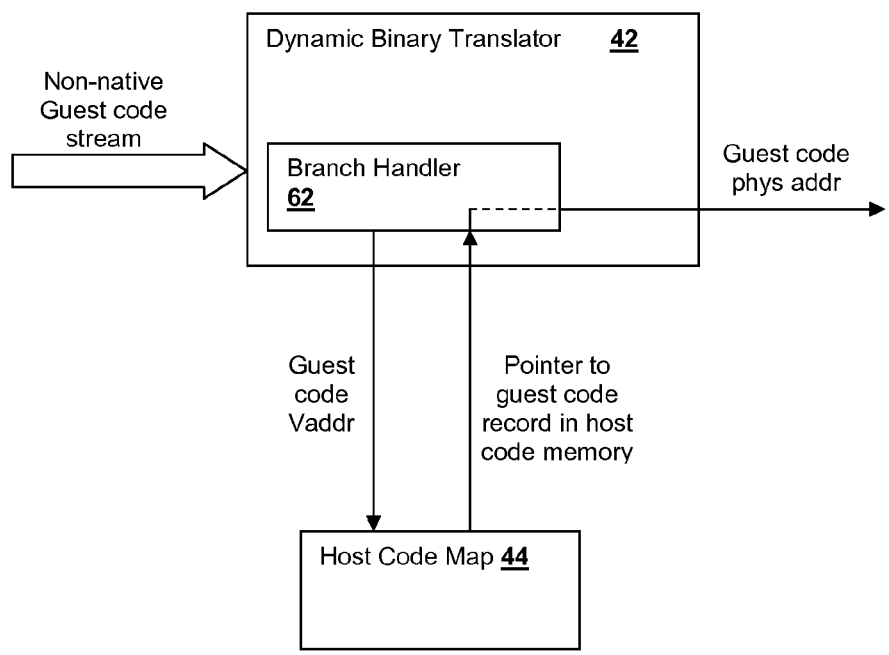
FIG. 4 is a block diagram of a dynamic code translation facility in accordance with an embodiment of the present invention.

Referring now to FIG. 4, a block diagram of a dynamic code translator in accordance with an embodiment of the invention is shown. A dynamic binary translator 42 translates a non-native guest code stream to native translated code, which is mapped to translated code pages 43 in virtual memory 45A, and an active portion of which is stored in physical memory as guest code physical pages 47. Dynamic binary translator includes a branch handler facility 62 that determines when branch is present in the un-translated code, inserts the tag or virtual target address into the translated code that handles the branch instruction, and generates a map entry in host code map 44A/44B, if the branch target address lies outside of the current code page, when information is available about the target address page, e.g., when the page containing the target is translated, or at execution of the translated code. During execution of the translated code, the host code map 44 is queried when a virtual address of the non-native code's branch target leaves the current virtual code page. The non-native virtual target address of the branch is used as a key to host code map 44, which as described above with respect to FIG. 3, may be an access to host code map 44A in virtual memory 45B, or may be by another mechanism, such as a hardware-accelerated hash table or content-addressable memory (CAM) that implements another form of look-up. In response, host code map 44 returns information that permits location of the physical code page in which the translated code corresponding to the un-translated branch instruction's target address lies, e.g., a structure (or record) that contains a physical memory pointer to one of translated code physical pages 47, or to the absolute location within translated code physical pages 47 within physical memory 45B. The actual location in physical memory 45B can generally be computed from the offset of the target address, as long as the location of the page itself is known, and the page sizes are the same between native OS OS and non-native OS OS', or their difference can be handled by computation. Once the translated code physical address is known, then execution can be directed to that physical address when the branch condition resolves to the condition required for the branch, if the physical page is loaded. If the translated code page for the target is not loaded, it is loaded in response to retrieving the physical address of the target. The resolution of the target address can be performed a priori (when the branch instruction is encountered) or at the time that the branch condition causes redirection to the target address.

In order to populate host code map 44B in guest operating system physical memory 45B and to create mappings from host code map 44A in virtual memory 45A, dynamic binary translator 42 may pre-populate some entries, which is needed at least for startup of non-native operating system image OS'. During subsequent execution, if a NULL pointer is present in host code map 44B, then the code page has not yet been translated and dynamic binary translator 42 can be directed to translate the needed code page. If an entry exists, but the record contains a guest code memory pointer that is invalid, directing execution will cause a page fault, which can inform dynamic binary translator 42 to cause guest operating system to resolve the physical address, which can then be used to update the mapping, e.g., by scanning the guest operating system page table or TLB.

Referring now to FIG. 5, a flowchart illustrating a method in accordance with an embodiment of the present invention is shown. When the hypervisor starts a virtual machine (VM) (decision 70), if the operating system and associated applications are in native code, i.e., the instruction set architecture (ISA) of the processors in the computer system supports the guest operating system (decision 71) then the operating system and applications are executed directly (step 72). Otherwise, if the operating system and associated applications are in non-native code (decision 71), unless a translation is already present (decision 73) then the program code is dynamically translated (step 74). Non-native operating system data addresses are mapped directly using the guest virtual memory management (VMM) facilities (step 75). If a program flow branch is encountered (decision 76) and the un-translated code virtual target address is in the current virtual code page (decision 77), then the target physical address is calculated directly from the offset (step 80). Otherwise if the un-translated virtual address is not in the current code page (decision 77), then the translated code physical address is obtained by using the non-native code virtual address as a key to get a record indicating the location of the translated code page that contains the target address (step 78). The translated code physical target address is obtained from the record (step 79) and execution is directed to the physical address. Until the non-native operating system/application execution is complete (decision 81), the process repeats in steps 75-81.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for hosting guest program code having a non-native instruction set executing within a host operating system within a virtualized computer system, the method comprising:
   dynamically translating the guest program code to translated native program code;
   caching pages of the translated native program code in a translated native code page cache;
   executing the translated native program code;
   detecting that a portion of the translated native program code corresponding to a non-native branch instruction will cause the executing to be directed to a particular translated code physical address corresponding to a particular non-native virtual address in a different first non-native virtual memory page than a second non-native virtual memory page containing the non-native branch instruction;
   responsive to detecting that the program control instruction will cause the executing to be directed to the particular translated code physical address, retrieving a record indicating a location of a translated code page containing the particular translated code physical address using the particular non-native virtual address as a key into a host code map that directly maps non-native virtual addresses to translated code physical addresses, wherein the retrieving comprises adding the particular non-native virtual address to a base address of the host code map to obtain a pointer into the host code map corresponding to an address at which the record is stored and de-referencing the pointer to obtain the record;
   loading the translated code page into physical memory; and
   directing the executing to the particular translated code physical address in the translated code page.

2. The computer-performed method of claim 1, further comprising: determining whether or not the pointer is a null pointer; and responsive to determining that the pointer is a null pointer, directing the dynamically translating to translate the translated code page, wherein the pointer being the null pointer indicates the translated code page has not yet been translated.

3. The computer-performed method of claim 1, wherein the de-referencing results in a page fault indicating the record is not present in the host code map, and wherein the method further comprises causing the dynamically translating to resolve the particular non-native virtual address to an address of the translated code page.

4. The computer-performed method of claim 1, wherein the pointer is a first pointer that points to a record containing a second pointer corresponding to the particular translated code physical address.

5. The computer-performed method of claim 4, wherein the second pointer is compressed to permit the host code map to store pointers larger than pointers in a native instruction set of the host operating system, and wherein the retrieving further comprises uncompressing the second pointer.

6. The computer-performed method of claim 1, wherein the dynamically translating further comprises:
   detecting that a branch instruction within the guest program code has the particular non-native virtual address lying outside of a code page containing the branch instruction; and
   populating the host code map from entries in a guest data structure representative of a virtual to physical memory map of an operating system hosting the guest program code such that only entries corresponding to the pages of the translated native program code that contain target addresses of corresponding non-native branch instructions that have target addresses in different virtual address pages from their corresponding non-native branch instructions are stored in the host code map.

7. The computer-performed method of claim 1, further comprising:
   performing a context switch that takes the guest program code off-line; and
   storing an image of the guest program code, wherein the host code map is automatically stored within the image of the guest program code by the storing.

8. The computer-performed method of claim 1, further comprising populating the host code map according to a virtual to physical memory map of an operating system hosting the guest program code such that only entries corresponding to the pages of the translated native program code that contain target addresses of corresponding non-native branch instructions that have target addresses in different virtual address pages from their corresponding non-native branch instructions are stored in the host code map.

9. A computer system comprising a processor for executing program instructions and a memory coupled to the processor for executing the program instructions, wherein the program instructions implement a host operating system hosting guest program code having a non-native instruction set within a virtual processing machine instance executing within the computer system, wherein the program instructions comprise program instructions for:

dynamically translating the guest program code to translated native program code; caching pages of the translated native program code in a translated native code page cache;

executing the translated native program code;

detecting that a portion of the translated native program code corresponding to a non-native branch instruction will cause the executing to be directed to a particular translated code physical address corresponding to a particular non-native virtual address in a different first non-native virtual memory page than a second non-native virtual memory page containing the non-native branch instruction;

responsive to detecting that the program control instruction will cause the executing to be directed to the particular translated code physical address, retrieving a record indicating a location of a translated code page containing the particular translated code physical address using the particular non-native virtual address as a key into a host code map that directly maps non-native virtual addresses to translated code physical addresses, wherein the program instructions for retrieving comprise program instructions for adding the particular non-native virtual address to a base address of the host code map to obtain a pointer into the host code map corresponding to an address at which the record is stored and de-referencing the pointer to obtain the record;

loading the translated code page into physical memory; and directing the executing to the particular translated code physical address in the translated code page.

10. The computer system of claim 9, wherein the program instructions further comprise program instructions for: determining whether or not the pointer is a null pointer; and responsive to determining that the pointer is a null pointer, directing the dynamically translating to translate the translated code page, wherein the pointer being the null pointer indicates the translated code page has not yet been translated.

11. The computer system of claim 9, wherein execution of the program instructions for de-referencing results in a page fault indicating the record is not present in the host code map, and wherein the program instructions further comprise program instructions for causing the dynamically translating to resolve the particular non-native virtual address of the translated branch instruction target to an address of the translated code page.

12. The computer system of claim 9, wherein the pointer is a first pointer that points to a record containing a second pointer corresponding to the translated code physical address.

13. The computer system of claim 12, wherein the second pointer is compressed to permit the host code map to store pointers larger than pointers in a native instruction set of the host operating system, and wherein the program instructions for retrieving further comprise program instructions for uncompressing the second pointer.

14. The computer system of claim 9, wherein the program instructions for dynamically translating further comprise program instructions for:

detecting that a branch instruction within the guest program code has the particular non-native virtual address lying outside of a code page containing the branch instruction; and populating the host code map from entries in a guest data structure representative of a virtual to physical memory map of an operating system hosting the guest program code such that only entries corresponding to the pages of the translated native program code that contain target addresses of corresponding non-native branch instructions that have target addresses in different virtual address pages from their corresponding non-native branch instructions are stored in the host code map.

15. The computer system of claim 9, wherein the program instructions further comprise program instructions for:

performing a context switch that takes the guest program code off-line; and storing an image of the guest program code, wherein the host code map is automatically stored within the image of the guest program code by the storing.

16. The computer system of claim 9, wherein the program instructions further comprise program instructions for populating the host code map according to a virtual to physical memory map of an operating system hosting the guest program code such that only entries corresponding to the pages of the translated native program code that contain target addresses of corresponding non-native branch instructions that have target addresses in different virtual address pages from their corresponding non-native branch instructions are stored in the host code map.

17. A computer program product comprising a computer-readable storage device storing program instructions for execution within a computer system, wherein the program instructions implement a host operating system for hosting guest program code having a non-native instruction set within a virtual processing machine instance within the computer system, wherein the program instructions comprise program instructions for:

dynamically translating the guest program code to translated native program code; caching pages of the translated native program code in a translated native code page cache; executing the translated native program code;

detecting that a portion of the translated native program code corresponding to a non-native branch instruction will cause the executing to be directed to a particular translated code physical address corresponding to a particular non-native virtual address in a different first non-native virtual memory page than a second non-native virtual memory page containing the non-native branch instruction;

responsive to detecting that the program control instruction will cause the executing to be directed to the particular translated code physical address, retrieving a record indicating a location of a translated code page containing the particular translated code physical address using the particular non-native virtual address as a key into a host code map that directly maps non-native virtual addresses to translated code physical addresses, wherein the program instructions for retrieving comprise program instructions for adding the particular non-native virtual address to a base address of the host code map to obtain a pointer into the host code map corresponding to an address at which the record is stored and de-referencing the pointer to obtain the record;

loading the translated code page into physical memory; and directing the executing to the particular translated code physical address in the translated code page.

18. The computer program product of claim 17, wherein the program instructions further comprise program instructions for: determining whether or not the pointer is a null pointer; and responsive to determining that the pointer is a null pointer, directing the dynamically translating to translate the translated code page, wherein the pointer being the null pointer indicates the translated code page has not yet been translated.

19. The computer program product of claim 17, wherein execution of the program instructions for de-referencing results in a page fault indicating the record is not present in the host code map, and wherein the program instructions further comprise program instructions for causing the dynamically translating to resolve the particular non-native virtual address to an address of the translated code page.

20. The computer program product of claim 17, wherein the pointer is a first pointer that points to a record containing a second pointer corresponding to the translated code physical address.

21. The computer program product of claim 20, wherein the second pointer is compressed to permit the host code map to store pointers larger than pointers in a native instruction set of the host operating system, and wherein the program instructions for retrieving further comprise program instructions for uncompressing the second pointer.

22. The computer program product of claim 17, wherein the program instructions for dynamically translating further comprise program instructions for:
    detecting that a branch instruction within the guest program code has the particular non-native virtual address lying outside of a code page containing the branch instruction; and
    populating the host code map from entries in a guest data structure representative of a virtual to physical memory map of an operating system hosting the guest program code such that only entries corresponding to the pages of the translated native program code that contain target addresses of corresponding non-native branch instructions that have target addresses in different virtual address pages from their corresponding non-native branch instructions are stored in the host code map.

23. The computer program product of claim 17, wherein the program instructions further comprise program instructions for:
    performing a context switch that takes the guest program code off-line; and
    storing an image of the guest program code, wherein the host code map is automatically stored within the image of the guest program code by the storing.

24. The computer program product of claim 17, wherein the program instructions further comprise program instructions for populating the host code map according to a virtual to physical memory map of an operating system hosting the guest program code such that only entries corresponding to the pages of the translated native program code that contain target addresses of corresponding non-native branch instructions that have target addresses in different virtual address pages from their corresponding non-native branch instructions are stored in the host code map.

* * * * *